United States Patent [19]

Rooz

[11] Patent Number: 4,763,390

[45] Date of Patent: Aug. 16, 1988

[54] ONE PIECE PLASTIC GARMENT CLAMP HAVING LIVE HINGE TOGGLE JOINT

[76] Inventor: William B. Rooz, 1060 Carolan, Burlingame, Calif. 94010

[21] Appl. No.: 48,243

[22] Filed: May 11, 1987

[51] Int. Cl.[4] .............................................. E05D 7/00
[52] U.S. Cl. ...................................... 24/487; 24/557; 24/562; 223/93
[58] Field of Search ................. 24/487, 557, 567, 564, 24/562, 563, 489; 223/91, 93; 281/45

[56] References Cited

U.S. PATENT DOCUMENTS

| | | | |
|---|---|---|---|
| D. 204,134 | 3/1966 | Duncan | 24/487 |
| 3,130,463 | 4/1964 | Posey | 24/557 |
| 3,292,223 | 12/1966 | Esposito, Jr. | 24/557 |
| 3,616,497 | 6/1970 | Esposito, Jr. | 223/93 |
| 3,733,656 | 5/1973 | Stalder | 24/557 |
| 3,906,957 | 9/1975 | Weston | 24/562 |
| 3,950,829 | 4/1976 | Cohen | 223/91 |
| 4,514,885 | 5/1985 | Delahousse et al. | 24/557 |
| 4,524,992 | 6/1985 | Linn | 24/487 |

FOREIGN PATENT DOCUMENTS

| | | | |
|---|---|---|---|
| 0075761 | 4/1983 | European Pat. Off. | 24/487 |
| 2278006 | 2/1976 | France | 24/557 |

*Primary Examiner*—Victor N. Sakran
*Attorney, Agent, or Firm*—David B. Harrison

[57] ABSTRACT

A one piece plastic clamp has a generally U-shaped outer structure including two outside legs and a thinned and downwardly curved upper bridging region from which the legs integrally depend. The clamp further includes a live hinge toggle joint for spanning the upper outside ends of the legs. The toggle joint has a release position peaking freely above the upper bridging region as the legs move relatively together and apart in the release position, and has a stable snap lock position directly adjacent to the upper bridging region thereby forcing the outer legs together in a clamped position. Two oppositely facing inner clamping jaws are relatively moveable freely with respect to each other and with respect to the outer structure in the release position. The jaws are for clamping an article between opposite faces when the clamp is in its snap lock position. Two live hinge beams join the jaws to opposite inside walls of the outer legs, with each beam having a leg live hinge means at a fulcrum location at a midregion of the inside wall of its corresponding leg and having a jaw live hinge means at a midregion of an outside wall of its corresponding jaw. When compressive force is applied to urge the lower open ends of the outer legs together, the legs are thereupon caused to bend about the fulcrum points, thereby spreading apart the thinned and downwardly curved upper bridging region which results in the live hinge toggle being snap released from its stable snap-lock position to its freely upwardly peaking release position.

7 Claims, 1 Drawing Sheet

ONE PIECE PLASTIC GARMENT CLAMP HAVING LIVE HINGE TOGGLE JOINT

BACKGROUND OF THE INVENTION

The present invention relates to clamping devices for garment hangers and the like. More particularly, the present invention relates to a one piece plastic garment clamp having a live hinge toggle joint.

Garment clamps are known and have been widely used for hanging garments. Examples of prior art clamping devices used with garment hangers are provided by U.S. Pat. Nos. 2,524,537; 3,203,061; and, 4,638,930. U.S. Pat. No. 2,524,537 describes a scissors like clamp arrangement by which the weight of the garment creates a downward force upon the clamp which in turn promotes a wedging action for retaining the garment in its clamped relationship with the clamp. U.S. Pat. Nos. 3,203,061 and 4,638,930 show multi-part garment clamps which rely upon steel springs in order to provide the requisite clamping force.

Other clamps and clips for diverse purposes or applications other than garments specifically are described in U.S. Pat. Nos. 3,616,497; 3,950,829; 4,338,747; and, 4,493,495. U.S. Pat. No. 3,616,497 describes a variety of one piece snap action clamping instruments intended for medical and surgical applications. U.S. Pat. No. 3,950,829 describes a three-part hanger clip wherein one of the members is a spring which slides down over two opposed jaw members thereby to urge the jaw members together. The clip is released when the spring member is slid upwardly so as to release the jaw members. U.S. Pat. No. 4,388,747 describes a one-piece molded toggle clamp which includes four live hinges in order to achieve the desired clamping action. U.S. Pat. No. 4,493,495 describes a variety of binding units which employ live hinge toggle joints.

While these references teach the use of flexible web ("live hinge") toggle joints, none of these references teach or suggest a practical release mechanism or arrangement in a one-piece clamp which enables reliable and ready reverse toggling release of the clamp. Thus, a hitherto unsolved need has arisen for a more effective one-piece plastic clamp, particularly for clamping garments to garment hangers, which overcomes the limitations and drawbacks of the prior art as exemplified by the foregoing prior art references.

SUMMARY OF THE INVENTION WITH OBJECTS AND ASPECTS

A general object of the present invention is to provide a one-piece clamp structure which overcomes the limitations and drawbacks of the prior art.

This object is realized by a one piece plastic clamp having a generally U-shaped outer structure including two outside legs and a thinned and downwardly curved upper bridging region from which the legs integrally depend. The clamp further includes a live hinge toggle joint for spanning the upper outside ends of the legs. The toggle joint has a release position peaking freely above the upper bridging region as the legs move relatively together and apart in the release position, and has a stable snap lock position directly adjacent to the upper bridging region thereby forcing the outer legs together in a clamped position. Two oppositely facing inner clamping jaws are relatively moveable freely with respect to each other and with respect to the outer structure in the release position. The jaws are for clamping an article between opposite faces when the clamp is in its snap lock position. Two live hinge beams join the jaws to opposite inside walls of the outer legs, with each beam having a leg live hinge means at a fulcrum location at a midregion of the inside wall of its corresponding leg and having a jaw live hinge means at a midregion of an outside wall of its corresponding jaw. When compressive force is applied to urge the lower open ends of the outer legs together, the legs are thereupon caused to bend about the fulcrum points, thereby spreading apart the thinned and downwardly curved upper bridging region which results in the live hinge toggle being snap released from its stable snap-lock position to its freely upwardly peaking release position. This release in turn releases the jaws from clamping the article.

In one aspect of the present invention the one piece plastic clamp includes an independent rod engagement structure provided transversely through a central portion of the thinned and downwardly curved upper bridging region for enabling the clamp to be snap locked to a rod.

In a second aspect of the present invention, the one piece plastic clamp is intended for clamping garments and the rod comprises a portion of a wire garment hanger. Typically, two clamps are used with the hanger for clamping garments and the like thereto.

In a third aspect of the present invention, the one piece plastic clamp has its two live hinge beams extending upwardly from their fulcrum locations so that downward force caused by the weight of an article clamped between the jaws increases the clamping force of the clamp in the clamped position by the resistance of the legs to being spread while in the clamped position.

In a fourth aspect of the present invention, the one piece plastic clamp is arranged so that upper ends of the jaws are forced into contact with the thinned and downwardly curved upper bridging region as compressive force is applied to the lower outer legs, thereby to facilitate snap release of the live hinge toggle joint.

In a fifth aspect of the present invention, the one piece plastic clamp has live hinge beams which are thickened so as to cooperate with the jaws to provide a bending fulcrum for the outer legs as compressive force is applied to the lower outer legs thereby to facilitate snap release of the live hinge toggle joint.

In a sixth aspect of the present invention, the one piece plastic clamp has opposite faces of its clamping jaws provided with complementary mating undulating surfaces to facilitate gripping of the article to be clamped by the clamp.

In a seventh aspect of the present invention, the one piece plastic clamp has its undulating surfaces provided with transverse peaks and grooves to facilitate gripping of the article.

These and other objects, advantages, aspects and features of the present invention will be more fully understood and appreciated by considering the following detailed description of a preferred embodiment, presented in conjunction with the accompanying drawings.

DETAILED DESCRIPTION OF A PREFERRED EMBODIMENT

Figure 1:
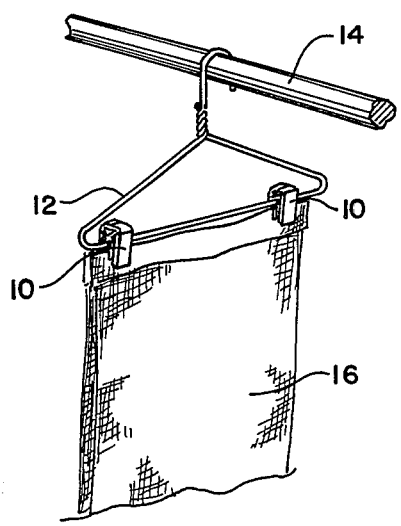
FIG. 1 is a diagrammatic view of a garment hanger equipped with two clamps in accordance with the principles of the present invention.

FIG. 1 shows two clamps 10 of the present invention snap locked to a conventional wire garment hanger 12 hanging from a conventional closet rod 14. Lower leg portions of e.g. a man's trousers 16 are depicted being clamped by the two clamps 10 in the intended application.

The clamps 10 are of one-piece construction of suitable plastic material such as polypropylene. Any elastomeric material providing "live hinge" characteristics by virtue of thinned web portions connecting other thicker portions of the formed structure may be suitably employed in the practice of the present invention. The clamps 10 are preferably mass produced by known injection molding processes. Alternatively, the clamps may be formed by extrusion through a die and sheared to a suitable transverse dimension, such as one half inch across.

Figure 3:
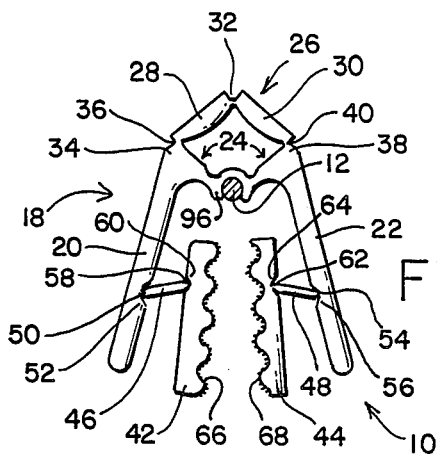
FIG. 3 is an end view of the clamp depicted in FIG. 2 shown in its released position.
Figure 2:
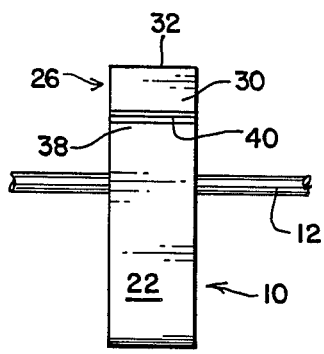
FIG. 2 is a side view in elevation of one of the clamps depicted in FIG. 1.

Referring now to FIG. 3, the clamp 10 includes a generally U-shaped outer structure 18. The structure 18 includes two depending outer legs 20, 22 and a thinned and generally downwardly curving upper bridging region 24. A live hinge toggle joint 26 includes two snap panels 28, 30 joined together by a central and uppermost live joint 32 formed of a very thin web portion of the material of which the clamp is made. The snap panel 28 is joined at an upper and outer region 34 of the leg 20 by a live hinge 36; and, the snap panel 30 is joined at an upper and outer region 38 of the leg 22 by a live hinge 40. In the release position shown in FIG. 3, the live hinge toggle joint 26 freely peaks upwardly as the legs 20 and 22 are moved apart, and collapses toward the upper bridging region 24 as the legs 20 and 22 are moved together.

Figure 7:
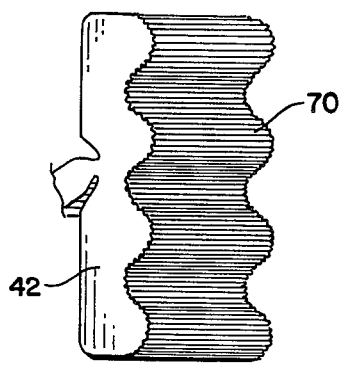
FIG. 7 is an enlarged detail view of one of the jaws of the FIG. 2 clamp showing the provision of a transverse undulating contour and transverse peaks and grooves to enhance gripping action of the clamp upon an article to be clamped.

Two oppositely facing jaws 42 and 44 are joined to the outer legs 20, 22 respectively by two live hinge beams 46 and 48. The beam 46 includes a live hinge 50 to a transverse grooved mid portion 52 of the inside wall of the leg 20; and the beam 48 includes a live hinge 54 to a transverse grooved mid portion 56 of the inside wall of the leg 22. Similarly, a live hinge 58 connects the beam 46 to a transverse grooved mid portion 60 of the outside wall of the jaw 42; and, a live hinge 62 connects the beam 48 to a transverse grooved mid portion 64 of the jaw 44. This arrangement enables the jaws 42 and 44 to have free relative movement within a limited range in a plane perpendicular to the longitudinal axis of the garment hanger wire 12 when the clamp is in its released position as shown in FIG. 3. Opposite inside faces 66 and 68 of the jaws 42, 44 are preferably formed with complementary, mating transverse undulations 66 and 68 to promote effective clamping action of the clamp when it is in its clamped position. Transverse peaks and grooves 70, as shown in FIG. 7, may also, or alternatively, be provided on the faces 66 and 68 to further promote effective gripping of the article (e.g. trousers 16) to be clamped.

Figure 4:
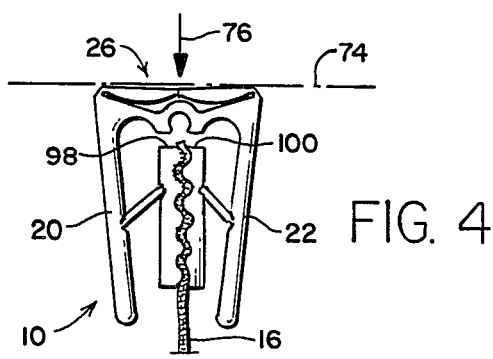
FIG. 4 is an end view of the clamp depicted in FIG. 2 shown in its stable snap-locked clamped position with a portion of the garment of FIG. 1 shown depending therefrom.

FIG. 4 illustrates the clamp 10 in its stable snaplocked position. In this position, the snap panels 28 and 30 of the live hinge toggle joint 26 have been displaced to a position below a horizontal axis denoted by the reference numeral 74 by a downward pressure or force denoted by the downward arrow 76. In this position, the outer legs 20 and 22 are stably biased toward each other, and the jaws are pressed into clamping engagement with the article 16 to be clamped.

One important aspect of the present invention is that the live hinge beams 46 and 48 extend upwardly from the outer legs 20, 22, so that the weight of the clamped article 16 creates an outward force against the legs 20 and 22. This outward force is met and overcome by the clamping force generated by the toggle joint in the stable locked position; however, this outward force increases the clamping force of the jaws 42 and 44. Tugging downwardly on the garment 16 also increases the clamping force of the clamp when it is in its clamped position as depicted in FIG. 4.

Figure 5:
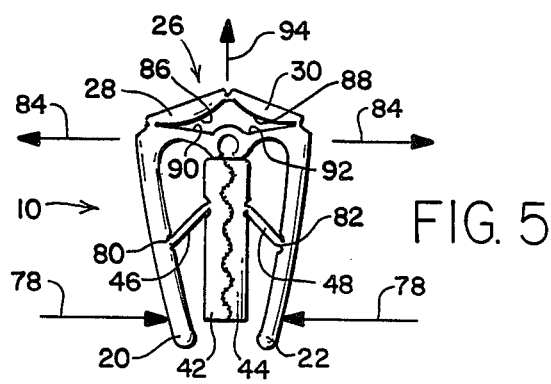
FIG. 5 is a diagrammatic end view showing that compressive pressure applied to the lower open ends of the outer legs results in slight expansion across the top of the FIG. 2 clamp which results in snap-release of the live hinge toggle joint.

FIG. 5 depicts diagrammatically the bending fulcrum snap release action provided by the structure of the clamp 10. In FIG. 5, a compressive force is applied to the lower open ends of the legs 20 and 22, as applied by squeesing the lower open ends between the finger and thumb, and as depicted diagrammatically by the oppositely facing force arrows 78. This force 78 causes the legs 20 and 22 to be bent around fulcrum locations 80 and 82 provided by the live hinge beams 46 and 48. The inward bending of the legs 20 and 22 results in a reactive force depicted by the oppositely diverging arrows 84. This force 84 spreads the upper curved region 24 slightly, but sufficiently to snap release the live hinge toggle joint 26. Snap release action is also promoted by a slight release bias force generated by contact between convexly curved lower surfaces 86 and 88 of the panels 28 and 30 being in contact with upper facing surfaces 90 and 92 of the bridging region 24.

When the legs 20 and 22 have been deflected sufficiently inwardly to spread the bridging region 24 to release the toggle joint 26, it springs upwardly as depicted by the arrow 94 in FIG. 5.

A transverse U-shaped central portion of the bridging region 24 provides a suitable clamping mechanism 96 for snap-locking the clamp 10 to the garment hanger rod 12. The structure 96 includes an open lower end, and its clamping action is independent of, and functionally unaffected by, the operation of the toggle joint 26. Thus, the clamp 10 remains on the rod 12 in either the clamped or released position, although there is less attachment force applied by the mechanism 96 when the toggle joint 26 is released than when it is in its clamped position.

Figure 6:
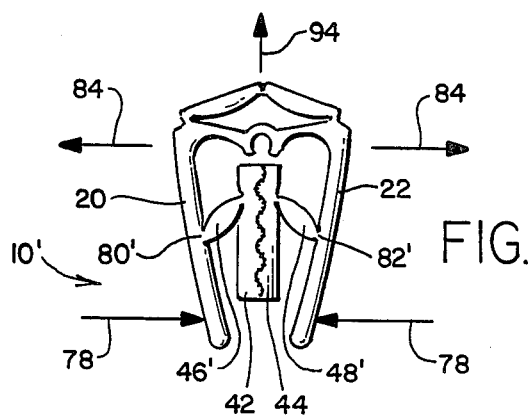
FIG. 6 is a reduced detail view in end elevation of an alternative embodiment of clamp incorporating the principles of the present invention in which thickened live hinge beams cooperate with the jaws to provide bending fulcrums for the outer legs.

As shown in FIG. 5, one or both of the upper ends 98 and 100 of the jaws 42 and 44 may come into contact with the mechanism 96 when the snap-release compression force 78 is applied. This contact tends to deflect the central portion of the upper bridging region upwardly to aid in the snap-release action of the clamp. Such contact is not essential, and FIG. 6 shows that a suitable fulcrum in a very similar clamp 10' may be achieved by providing thicker and shorter hinge beams 46' and 48', so that they cooperate with the jaws 42 and 44 and legs 20 and 22 to provide suitable bending fulcrums 80' and 82'.

Having thus described preferred embodiments of the present invention, it will be readily apparent that many changes and variations in structural detail and arrangement will be suggested to the reader of ordinary skill in the art without departure from the spirit and scope of the present invention. The foregoing disclosure is intended to be illustrative of the present invention but not limiting of the scope thereof which is more particularly defined by the following claims.

I claim:

1. A one piece plastic clamp having a generally U-shaped outer structure including two outside legs and a thinned and downwardly curved upper bridging region from which the legs integrally depend, the clamp further including:

live hinge toggle joint means for spanning the upper outside ends of the legs, the toggle joint means having a release position peaking freely above the upper bridging region as the legs move relatively together and apart in the release position, and having a stable snap lock position directly adjacent to the upper bridging region thereby forcing the outer legs together in a clamped position;

two oppositely facing inner clamping jaws relatively moveable freely with respect to each other and to the outer structure in the release position for clamping an article between directly opposed jaw faces when the clamp is in the snap lock position, two live hinge beams for joining the jaws to opposite inside walls of the outer legs, each jaw having a leg live hinge means at a fulcrum location at a midregion of the inside wall of its corresponding leg and having a jaw live hinge means at a midregion of an outside wall of its corresponding jaw, the two live hinge beams extending upwardly from their fulcrum locations so that downward force caused by the weight of an article clamped between the jaws increases the clamping force of the clamp in the clamped position by the resistance of the legs to being spread while in the clamped position, whereby compressive force applied to urge the lower open ends of the outer legs together causes the legs to bend about the fulcrum points, thereby spreading apart the thinned and downwardly curved upper bridging region which causes the live hinge toggle means to snap release to its release position, thereupon releasing the jaws from clamping of the article.

2. The one piece plastic clamp set forth in claim 1 further comprising independent rod engagements means provided transversely through a central portion of the thinned and downwardly curved upper bridging region for enabling the clamp to be snap locked to a rod.

3. The one piece plastic clamp set forth in claim 2 wherein said rod comprises a portion of a wire garment hanger and said clamp is for clamping garments and the like to the garment hanger.

4. The one piece plastic clamp set forth in claim 1 wherein upper ends of the jaws are forced into contact with the thinned and downwardly curved upper bridging region as compressive force is applied to the lower outer legs thereby to facilitate snap release of the live hinge toggle joint means.

5. The one piece plastic clamp set forth in claim 1 wherein the live hinge beams are thickened and cooperate with the jaws to provide a bending fulcrum for the outer legs as compressive force is applied to the lower outer legs thereby to facilitate snap release of the live hinge toggle joint means.

6. The one piece plastic clamp set forth in claim 1 wherein the opposite faces of the clamping jaws are provided with complementary mating undulating surfaces to facilitate gripping of the article to be clamped by the clamp.

7. The one piece plastic clamp set forth in claim 1 wherein the surfaces are provided with transverse peaks and grooves to facilitate gripping of the article to be clamped by the clamp.

* * * * *